US010264476B2

(12) United States Patent
Nakagawa

(10) Patent No.: US 10,264,476 B2
(45) Date of Patent: Apr. 16, 2019

(54) WIRELESS COMMUNICATION DEVICE, FREQUENCY DETERMINATION METHOD FOR WIRELESS COMMUNICATION DEVICE, AND PROGRAM THEREFOR

(71) Applicant: NEC Corporation, Tokyo (JP)

(72) Inventor: Ryo Nakagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 198 days.

(21) Appl. No.: 15/124,339

(22) PCT Filed: Feb. 27, 2015

(86) PCT No.: PCT/JP2015/001046
§ 371 (c)(1),
(2) Date: Sep. 7, 2016

(87) PCT Pub. No.: WO2015/136876
PCT Pub. Date: Sep. 17, 2015

(65) Prior Publication Data

US 2017/0019805 A1 Jan. 19, 2017

(30) Foreign Application Priority Data

Mar. 11, 2014 (JP) ................................. 2014-047774

(51) Int. Cl.
*H04W 24/02* (2009.01)
*H04W 16/10* (2009.01)

(52) U.S. Cl.
CPC ........... *H04W 24/02* (2013.01); *H04W 16/10* (2013.01)

(58) Field of Classification Search
None
See application file for complete search history.

(56) References Cited

U.S. PATENT DOCUMENTS 9,883,516 B2 * 1/2018 Lee ..................... H04W 72/082
2003/0079232 A1 * 4/2003 Kirino .................... H04N 7/106
725/124

(Continued)

FOREIGN PATENT DOCUMENTS

EP 2530853 A2 12/2012
JP H08-149133 A 6/1996

(Continued)

OTHER PUBLICATIONS

International Search Report corresponding to PCT/JP2015/001046 dated May 26, 2015 (one page).

*Primary Examiner* — Jeffrey M Rutkowski
*Assistant Examiner* — Ning Li
(74) *Attorney, Agent, or Firm* — Wilmer Cutler Pickering Hale and Dorr LLP

(57) ABSTRACT

In a wireless communication device that uses different frequencies for transmission and reception, it is not easy to determine and set the frequencies used for transmission and reception. Therefore, this wireless communication device, frequency determination method for a wireless communication device, and program are characterized in that: first reception frequency change plan data is created on the basis of a frequency adjustment plan; a transmission frequency corresponding to the validity period of the frequency adjustment plan is used to transmit the first reception frequency change plan data; second reception frequency change plan data, created by a wireless communication device which is a counterpart of the wireless communication device, is received; and the frequency adjustment plan is updated on the basis of the second reception frequency change plan data.

9 Claims, 10 Drawing Sheets

(56) References Cited

U.S. PATENT DOCUMENTS

| | | | | |
|---|---|---|---|---|
| 2003/0105890 | A1* | 6/2003 | Sakuma | G06F 21/10 710/1 |
| 2006/0053452 | A1* | 3/2006 | Lee | H04L 12/40117 725/81 |
| 2010/0080167 | A1* | 4/2010 | Cordeiro | H04L 5/0044 370/328 |
| 2011/0087793 | A1* | 4/2011 | Akiyama | H04L 67/12 709/230 |
| 2012/0170534 | A1* | 7/2012 | Kim | H04H 20/42 370/329 |
| 2015/0143108 | A1* | 5/2015 | Demeter | H04L 9/0891 713/158 |
| 2015/0373729 | A1* | 12/2015 | Lee | H04W 8/245 370/329 |

FOREIGN PATENT DOCUMENTS

| | | | |
|---|---|---|---|
| JP | 2000-315984 | A | 11/2000 |
| JP | 2001-128224 | A | 5/2001 |
| JP | 2004-158954 | A | 6/2004 |
| JP | 2013-518459 | A | 5/2013 |
| JP | 2013-172324 | A | 9/2013 |

* cited by examiner

| EXPIRATION DATE | TRANSMISSION FREQUENCY | RECEPTION FREQUENCY |
|---|---|---|
| EXPIRATION DATE 1 (YEAR, MONTH, DAY, HOUR, MINUTE, SECOND) | TRANSMISSION FREQUENCY 1 | RECEPTION FREQUENCY 1 |
| EXPIRATION DATE 2 (YEAR, MONTH, DAY, HOUR, MINUTE, SECOND) | TRANSMISSION FREQUENCY 2 | RECEPTION FREQUENCY 2 |
| EXPIRATION DATE 3 (YEAR, MONTH, DAY, HOUR, MINUTE, SECOND) | TRANSMISSION FREQUENCY 3 | RECEPTION FREQUENCY 3 |
| ⋮ | ⋮ | ⋮ |
| EXPIRATION DATE n (YEAR, MONTH, DAY, HOUR, MINUTE, SECOND) | TRANSMISSION FREQUENCY n | RECEPTION FREQUENCY n |

WIRELESS COMMUNICATION DEVICE, FREQUENCY DETERMINATION METHOD FOR WIRELESS COMMUNICATION DEVICE, AND PROGRAM THEREFOR

CROSS-REFERENCE TO RELATED APPLICATIONS

This application is a national stage application of International Application No. PCT/JP2015/001046 entitled "Wireless Communication Device, Frequency Determination Method for Wireless Communication Device, and Program Therefor" filed on Feb. 27, 2015, which claims priority to Japanese Application No. 2014-047774 filed on Mar. 11, 2014, the disclosures of which are hereby incorporated by reference in their entirety.

TECHNICAL FIELD

The present invention relates to a wireless communication device, a frequency determination method for a wireless communication device, and a program therefor.

BACKGROUND ART

When placing wireless communication devices that use different frequencies for transmission and reception, wireless frequencies for transmission and reception need to be uniquely determined so as to establish wireless communication among the devices.

When placing the wireless communication devices, a worker had to check a radio wave status between the devices to be newly provided in advance, derive wireless frequencies for transmission and reception, which are estimated to be idler frequencies, and perform setting with respect to the wireless communication devices. In addition, there was not always guarantee that the wireless communication is established by the estimated frequencies, and in some cases, workers had to communicate with each other to perform readjustment, for example, using other frequencies.

FIG. 1 illustrates an image example when newly placing wireless communication devices.

It is assumed that already-placed wireless communication devices (11-1, 11-2, 12-1, 12-2) achieve wireless connections among the devices at respective wireless frequencies (F3, F4, F5, F6). It is to be noted that F3 and F4, and, F5 and F6 are frequencies different from each other. For example, the wireless communication device 11-1 transmits wireless data at the frequency F3 and receives wireless data at the frequency F4.

When newly placing wireless communication devices (10-1, 10-2) in this region, a worker seeks a choice of frequencies unaffected by the radio waves (F3, F4, F5, F6) flying around. After that, the worker finds the choice of frequencies (for example, F1, F1', F2, F2'), and uniquely determines frequencies to be used among these while performing setting of frequencies with respect to the wireless communication devices (10-1, 10-2) and verifying whether wireless communication is established or not between the actual devices. It is to be noted that the respective wireless communication devices need not be placed as in FIG. 1, and may be placed so as to be able to communicate with one another.

As described above, in order to determine frequencies for transmission and reception among wireless communication devices to be newly placed, hand working by a worker was required, and working man-hours and cost were high.

For the foregoing problem, PTL 1 discloses a wireless communication system capable of suppressing crosstalk and selecting an appropriate frequency in a short time.

In PTL 1, by using information of positions of radios to be placed and a frequency resource table including a plurality of frequencies that can be used for wireless communication and information of positions where the respective frequencies are used, a frequency to be used for the wireless communication between the radios is determined.

In addition, an automatic setting method and an automatic setting system for a wireless frequency of PTL 2 and 3 disclose an automatic setting method and an automatic setting system for a wireless frequency, which can easily and automatically determine and set a wireless frequency of a newly-placed wireless communication line.

In PTL 2 and 3, for frequencies that can be used in a wireless line, by using a wireless communication device data table including, for each wireless frequency, values of the wireless frequency and an ID of a wireless communication device using the wireless frequency, a wireless frequency of a newly-placed wireless line is determined.

CITATION LIST

Patent Literature

[PTL 1] Japanese Laid-open Patent Publication No. 2013-172324
[PTL 2] Japanese Laid-open Patent Publication No. 2001-128224
[PTL 3] Japanese Laid-open Patent Publication No. 2000-315984

SUMMARY OF INVENTION

Technical Problem

However, in the above-described inventions of PTL 1, 2, and 3, a worker or the like has to check which frequency is currently used, or which frequency can be used in advance, in a place where a radio or the like is newly placed. Therefore, it is concerned that a lot of time and cost of the worker or the like are taken. In addition, the above-described inventions of PTL 1, 2, and 3 are setting methods of a radio or the like that uses the same frequency for transmission and reception of a signal, and do not take a radio or the like that uses different frequencies for transmission and reception of a signal into consideration.

It is an object of the present invention to provide a wireless communication device, a frequency determination method for a wireless communication device, and a program therefor, which solve the above-described problem of not being able to easily determine and set frequencies used for transmission and reception, in a wireless communication device that uses different frequencies for transmission and reception.

Solution to Problem

A wireless communication device, according to the present invention, that uses different frequencies for a transmission frequency and a reception frequency of wireless data, the wireless communication device comprises: a frequency adjustment processing means that creates, based on a first frequency adjustment plan that is a combination of the transmission frequency, the reception frequency, and a validity period of the transmission frequency and the reception frequency, first reception frequency change plan data including a system time of the wireless communication device, the validity period, and a combination of a reception frequency corresponding to the validity period; a transmission means that transmits the first reception frequency change plan data at a transmission frequency corresponding to the validity period based on the first frequency adjustment plan; and a reception means that receives second reception frequency change plan data transmitted from a wireless communication device which is a counterpart and created based on a second frequency adjustment plan of the wireless communication device which is a counterpart at the reception frequency corresponding to the validity period of the first frequency adjustment plan, wherein the frequency adjustment processing means updates the first frequency adjustment plan based on the received second reception frequency change plan data.

A transmission and reception frequency determination method, according to the present invention, for a wireless communication device that uses different frequencies for a transmission frequency and a reception frequency of wireless data, the transmission/reception frequency determination method comprises: creating, based on a first frequency adjustment plan that is a combination of the transmission frequency, the reception frequency, and a validity period of the transmission frequency and the reception frequency, first reception frequency change plan data including a system time of the wireless communication device, the validity period, and a combination of a reception frequency corresponding to the validity period; transmitting the first reception frequency change plan data at a transmission frequency corresponding to the validity period based on the first frequency adjustment plan; and receiving second reception frequency change plan data transmitted from a wireless communication device which is a counterpart and created based on a second frequency adjustment plan of the wireless communication device which is a counterpart at the reception frequency corresponding to the validity period based on the first frequency adjustment plan, wherein the first frequency adjustment plan is updated based on the received second reception frequency change plan data.

A program, according to the present invention, that makes a computer of a wireless communication device that uses different frequencies for a transmission frequency and a reception frequency of wireless data execute: reception frequency change plan creation processing that creates, based on a first frequency adjustment plan that is a combination of the transmission frequency, the reception frequency, and a validity period of the transmission frequency and the reception frequency, first reception frequency change plan data including a system time of the wireless communication device, the validity period, and a combination of a reception frequency corresponding to the validity period; transmission processing that transmits the first reception frequency change plan data at a transmission frequency corresponding to the validity period based on the first frequency adjustment plan; reception processing that receives second reception frequency change plan data transmitted from a wireless communication device which is a counterpart and created based on a second frequency adjustment plan of the wireless communication device which is a counterpart at the reception frequency corresponding to the validity period of the first frequency adjustment plan; and frequency adjustment processing that updates the first frequency adjustment plan based on the received second reception frequency change plan data.

Advantageous Effects of Invention

The wireless communication device, the frequency determination method for a wireless communication device, and the program therefor of the present invention have an effect of being able to easily determine and set frequencies used for transmission and reception, in a wireless communication device that uses different frequencies for transmission and reception.

BRIEF DESCRIPTION OF DRAWINGS

FIG. 4 illustrates an example of a frequency adjustment plan of the wireless communication device of the second exemplary embodiment of the present invention.

DESCRIPTION OF EMBODIMENTS

First Exemplary Embodiment

A first exemplary embodiment of the present invention will be described. It is to be noted that attached drawing reference symbols are conveniently attached to the respective elements as examples to facilitate understanding, and are not intended to limit the present invention to the illustrated modes.

Figure 1:
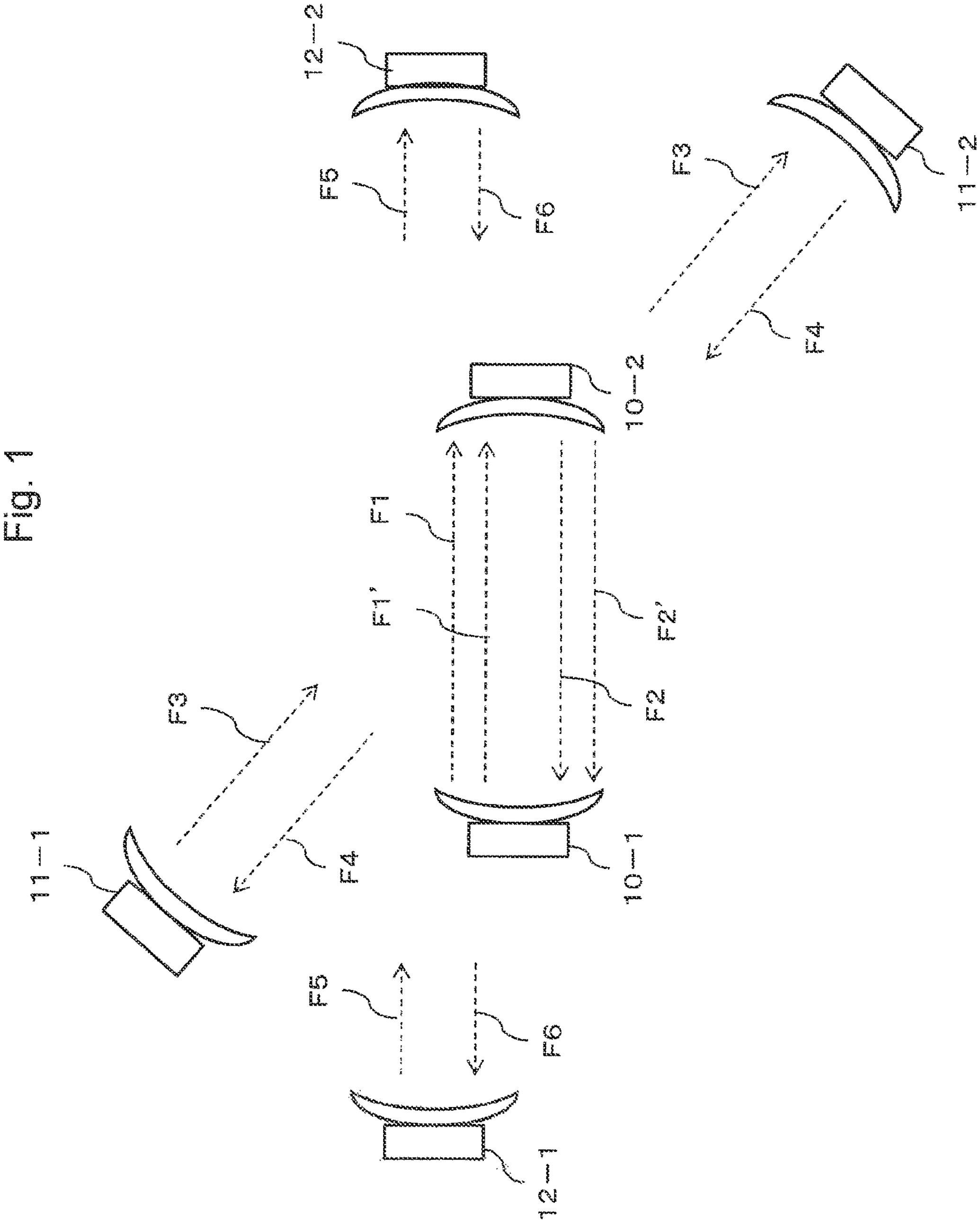
FIG. 1 illustrates an image example of existing wireless communication devices and wireless communication devices to be newly placed.
Figure 2:
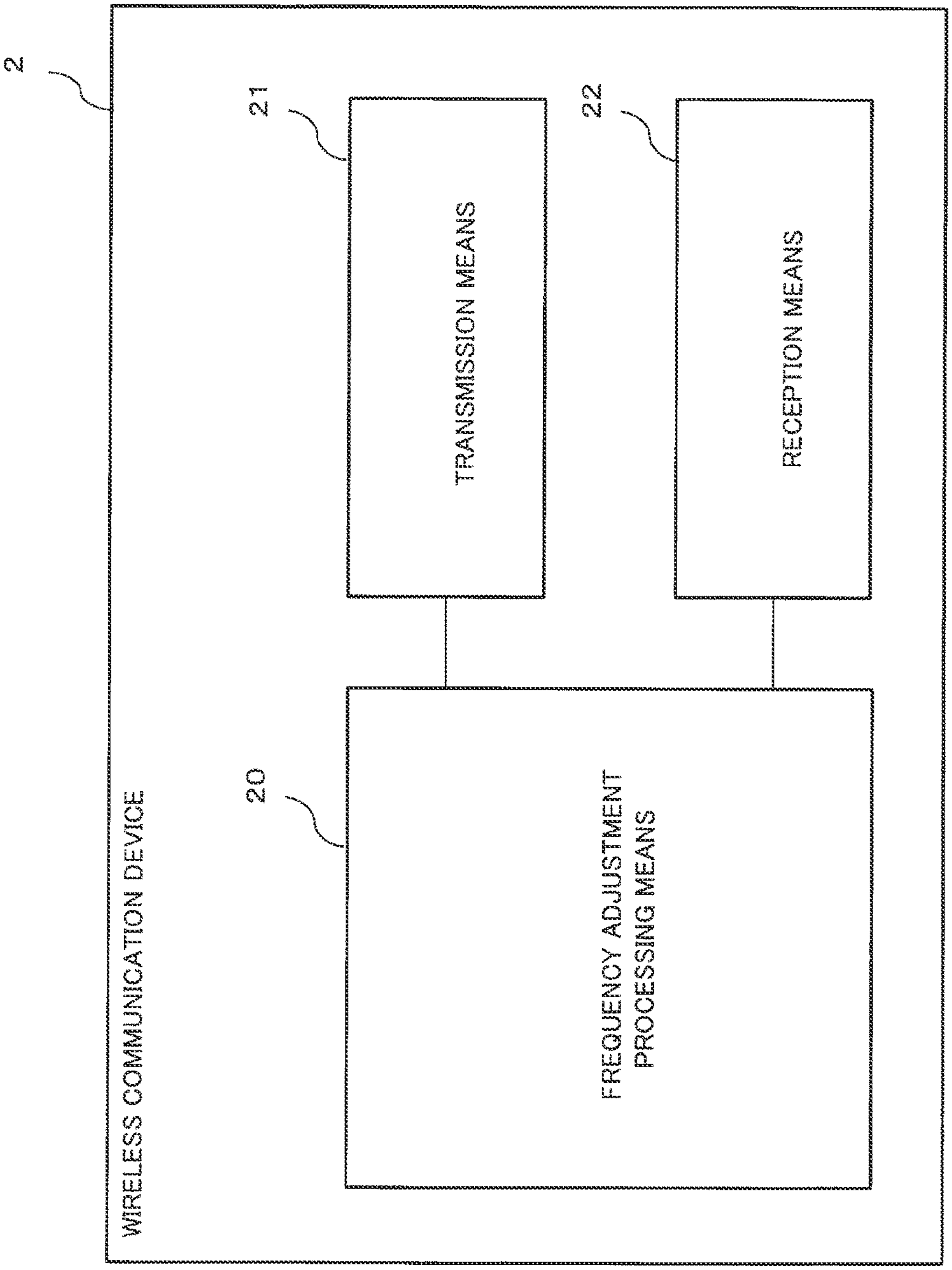
FIG. 2 illustrates a configuration example of a wireless communication device of a first exemplary embodiment of the present invention.

FIG. 2 illustrates a configuration example of a functional block diagram of a wireless communication device 2 of the first exemplary embodiment of the present invention. It is to be noted that a wireless communication device which is a counterpart of the wireless communication device 2 also has the same configuration.

The wireless communication device 2 of the first exemplary embodiment has a frequency adjustment processing means 20, a transmission means 21, and a reception means 22.

The frequency adjustment processing means 20 creates reception frequency change plan data on the basis of a frequency adjustment plan that is a combination of a transmission frequency, a reception frequency, and a validity period of the transmission frequency and the reception frequency.

The reception frequency change data includes a combination of a system time of the wireless communication device 2, the validity period included in the frequency adjustment plan, and the reception frequency corresponding to the validity period.

The transmission means 21 transmits the reception frequency change plan data created by the frequency adjustment processing means 20 at a transmission frequency corresponding to the validity period of the frequency adjustment plan.

The reception means 22 receives wireless data transmitted from the wireless communication device which is a counterpart of the wireless communication device 2 at the reception frequency corresponding to the validity period of the frequency adjustment plan. At this time, the wireless data to be received is reception frequency adjustment plan data transmitted from the wireless communication device which is a counterpart and created on the basis of a frequency adjustment plan of the wireless communication device which is a counterpart.

In addition, the frequency adjustment processing means 20 updates the frequency adjustment plan on the basis of the received reception frequency adjustment plan data.

According to the foregoing structure, the wireless communication device of the first exemplary embodiment can easily determine and set frequencies used for transmission and reception, in a wireless communication device that uses different frequencies for transmission and reception.

Second Exemplary Embodiment

A second exemplary embodiment of the present invention will be described. It is to be noted that attached drawing reference symbols are conveniently attached to the respective elements as examples to facilitate understanding, and are not intended to limit the present invention to the illustrated modes.

Figure 3:
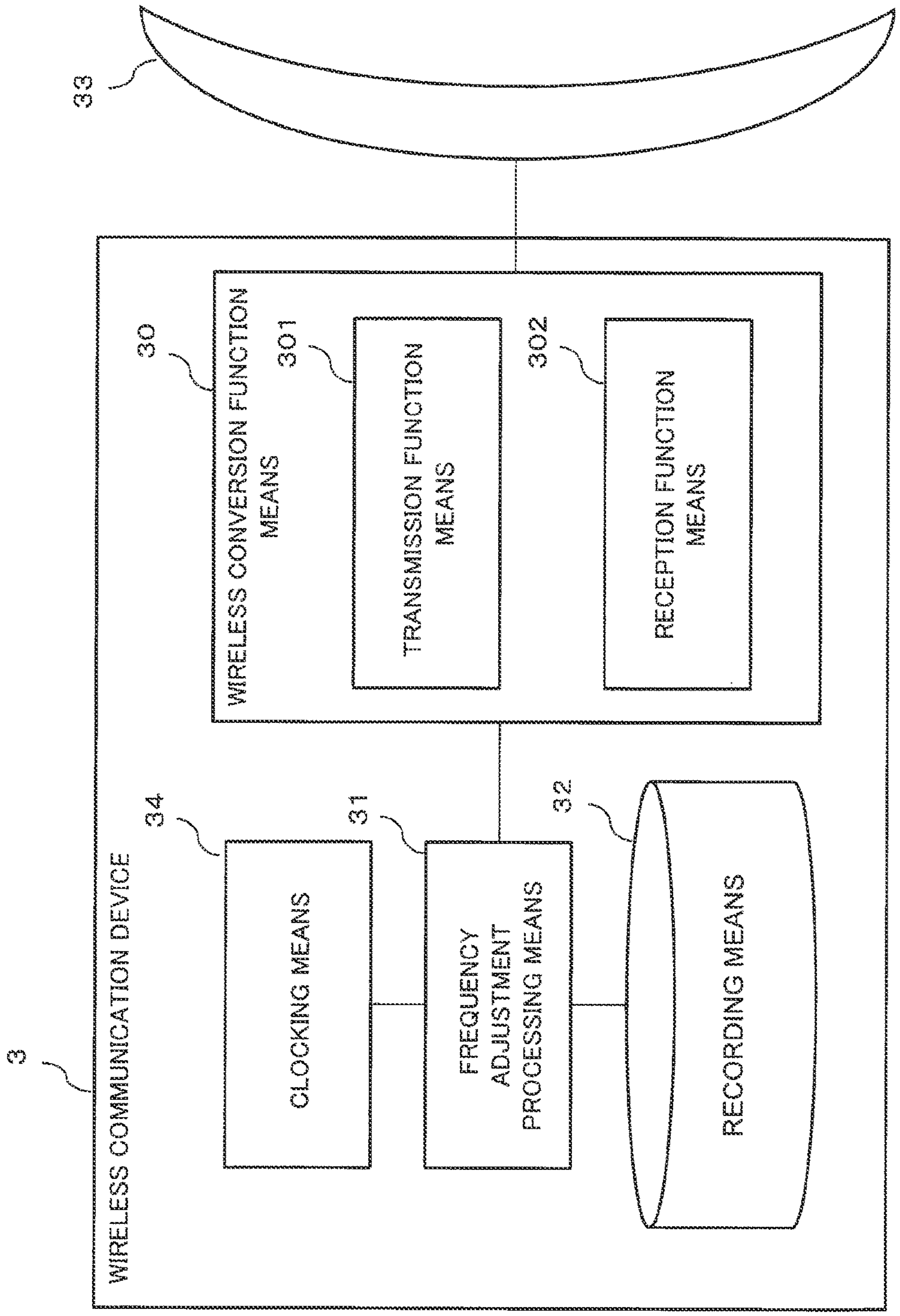
FIG. 3 illustrates a configuration example of a wireless communication device of a second exemplary embodiment of the present invention.

FIG. 3 illustrates a configuration example of a functional block diagram in a wireless communication device 3 of the second exemplary embodiment of the present invention. It is to be noted that a wireless communication device which is a counterpart of the wireless communication device 3 also has the same configuration.

The wireless communication device 3 includes a wireless conversion function means 30, a frequency adjustment processing means 31, a recording means 32, an external antenna 33, and a clocking means 34.

The wireless conversion function means 30 is connected to the external antenna 33, is a processing means for performing wireless conversion of a digital signal or the like, and has a changing function of frequencies used for transmission and reception. The wireless conversion function means 30 has a transmission function means 301 and a reception function means 302 of wireless data.

The frequency adjustment processing means 31 derives a frequency adjustment plan 4 used for transmission and reception. In addition, the frequency adjustment processing means 31 is a program control means for issuing a frequency change instruction to the transmission function means 301 and the reception function means 302 of wireless data. It is to be noted that the frequency adjustment plan 4 derived by the frequency adjustment processing means 31 is converted into a format of reception frequency change plan data 6 by the frequency adjustment processing means 31, and transmission of the reception frequency change plan data 6 through the wireless conversion function means 30 from the transmission function means 301 of wireless data to the wireless communication device which is a counterpart is tried. In addition, the frequency adjustment processing means 31 updates the frequency adjustment plan 4 on the basis of information of the wireless communication device which is a counterpart, received by the reception function means 302 through the wireless conversion function means 30.

The recording means 32 records and holds a frequency adjustment plan parameter 5, necessary when the frequency adjustment processing means 31 derives the frequency adjustment plan 4, and the derived frequency adjustment plan 4.

The clocking means 34 performs measurement of a system time of the wireless communication device 3. It is to be noted that the measurement of a system time of the wireless communication device 3 need not necessarily be performed by the clocking means 34, and time data may be obtained by using a GPS, for example.

FIG. 4 illustrates an example of a data table of the frequency adjustment plan 4 of the wireless communication device 3 itself, derived by the frequency adjustment processing means 31.

An expiration date field 40 is a field that becomes an opportunity to change a frequency, and stores data of year, month, day, hour, minute, and second, for example. It is to be noted that the value may be evaluated on the basis of the frequency adjustment plan parameter 5 described below and the measurement result of the clocking means 34 of the wireless communication device 3, for example.

A transmission frequency field 41 is a field that stores a transmission frequency, and means that the transmission function means 301 performs transmission at the frequency until the time stored in the expiration date field 40.

A reception frequency field 42 is a field that stores a reception frequency, and means that the reception function means 302 performs reception at the frequency until the time stored in the expiration date field 40.

For example, in the frequency adjustment plan 4 of FIG. 4, it is meant that, when the time measured by the clocking means 34 of the wireless communication device 3 is before the expiration date 1, the transmission function means 301 performs transmission at the transmission frequency 1 and the reception function means 302 performs reception at the reception frequency 1. In addition, it is meant that, when the system time measured by the clocking means 34 of the wireless communication device 3 is after the expiration date 1 and before the expiration date 2, the transmission function means 301 performs transmission at the transmission frequency 2 and the reception function means 302 performs reception at the reception frequency 2. It is to be noted that the value included in the expiration date field 40 is not limited to the above-described value, and may be a value indicating a validity period. For example, if the system time measured by the clocking means 34 of the wireless communication device 3 is within a validity period between a first specified time and a second specified time, transmission and reception may be performed at a transmission frequency and a reception frequency corresponding to the validity period.

Figure 5:
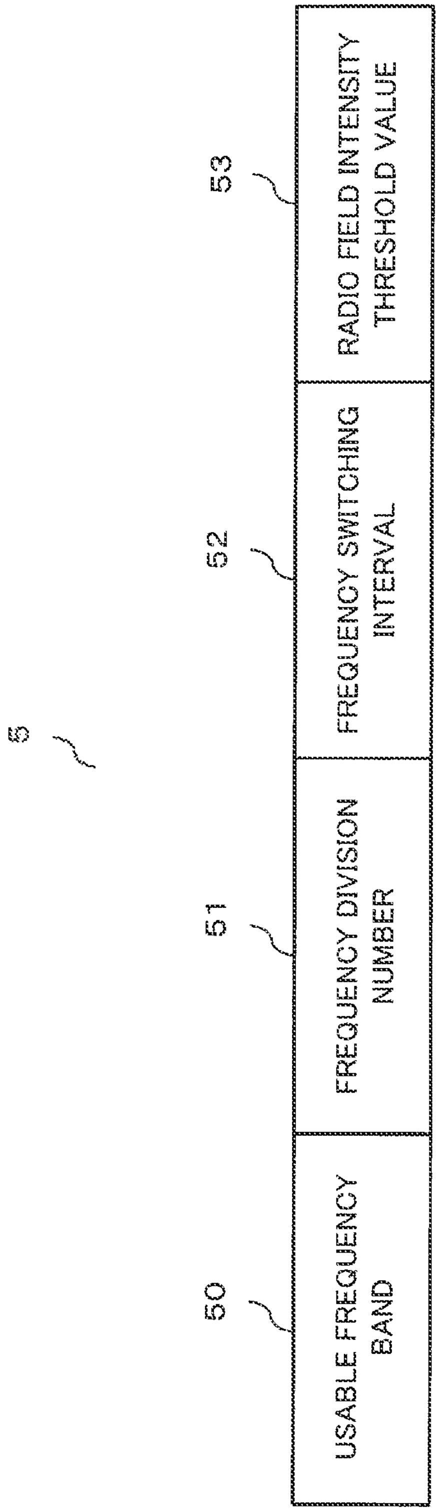
FIG. 5 illustrates an example of a frequency adjustment plan parameter for deriving the frequency adjustment plan of the wireless communication device of the second exemplary embodiment of the present invention.

FIG. 5 illustrates the frequency adjustment plan parameter 5 used when creating the above-described frequency adjustment plan 4. An initial value of the frequency adjustment plan parameter 5 is set at factory shipment, for example. In addition, for example, a worker or the like may input to the wireless communication device 3 and set the frequency adjustment plan parameter 5.

A usable frequency band 50 stores a value of a frequency band that the target wireless communication device 3 can use.

A frequency division number 51 stores a value for dividing the value stored in the usable frequency band 50.

A frequency switching interval 52 stores a value of a time interval for switching a frequency.

A radio field intensity threshold value 53 stores a value used when determining whether a radio wave at a certain frequency measured by the wireless communication device 3 is usable.

It is to be noted that the usable frequency band 50, the frequency division number 51, the frequency switching interval 52, and the radio field intensity threshold value 53 are used when determining the frequency adjustment plan 4, which is described below.

Figure 6:
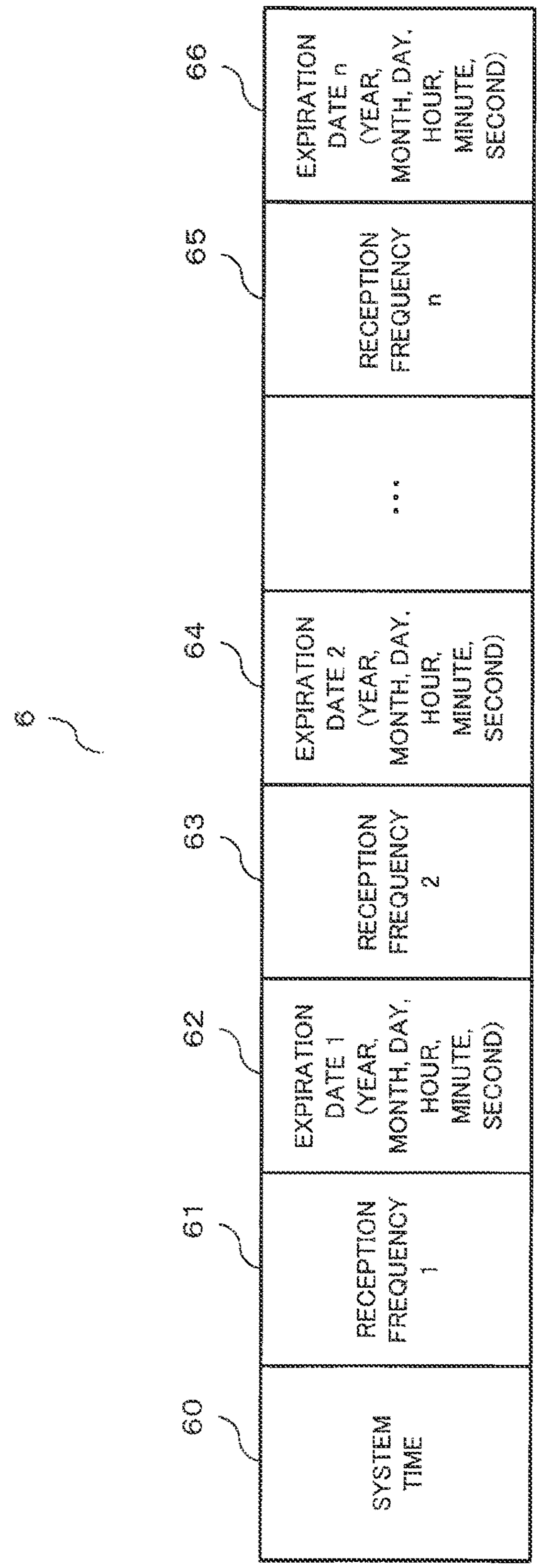
FIG. 6 illustrates an example of reception frequency change plan data of the second exemplary embodiment of the present invention.

FIG. 6 illustrates a format example of the reception frequency change plan data 6 that the wireless communication device 3 transmits to the wireless communication device which is a counterpart.

A system time 60 stores the system time of the wireless communication device 3 itself, and the system time 60 is updated every time data is transmitted. For example, the system time 60 may be the system time of the wireless communication device 3 when transmitting data. In addition, a value of the system time may be evaluated on the basis of the measurement result of the clocking means 34 of the wireless communication device 3, for example.

Reception frequencies 61, 63, 65 store reception frequencies for which the wireless communication device 3 itself waits, for reception, on the basis of the frequency adjustment plan 4.

Expiration dates 62, 64, 66 store values of the expiration date field 40, which correspond to the above-described reception frequencies 61, 63, 65, on the basis of the frequency adjustment plan 4.

In other words, the reception frequency change plan data 6 of FIG. 6 is an example illustrating the reception frequencies for which the wireless communication device 3 waits, for reception and the expiration dates thereof.

It is to be noted that FIG. 6 illustrates an example of the reception frequency change plan data 6 created from the example of the frequency adjustment plan 4 of FIG. 4. In addition, FIG. 6 illustrates an example in the case of including a plurality of (n in FIG. 6) combinations of the reception frequencies and the expiration dates thereof (the number of pieces of data).

An automatic adjustment method of frequencies for transmission and reception of the wireless communication device of the second exemplary embodiment of the present invention will be described in detail.

When the wireless communication device 3 is newly placed, a worker physically places the wireless communication device 3.

Regarding setting associated with wireless transmission, for example, automatic adjustment of frequencies for transmission and reception of the second exemplary embodiment of the present invention may be performed to establish a wireless transmission path by operation of a physical switch or the like by a worker, or automatic adjustment of frequencies for transmission and reception may be performed by remote-controlled operation. In addition, automatic adjustment of frequencies for transmission and reception may be performed by timer-control with the clocking means 34.

Figure 7:
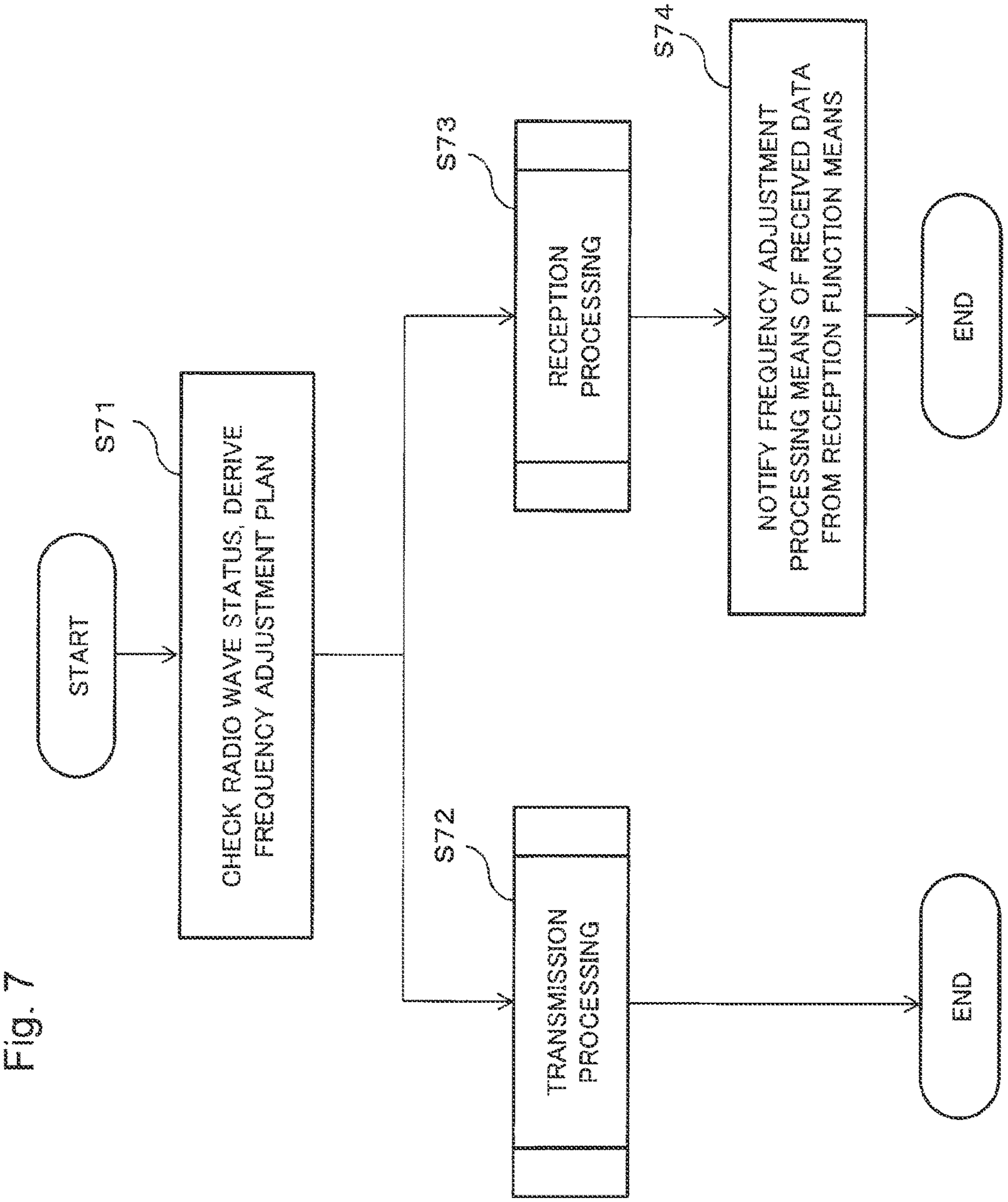
FIG. 7 illustrates an example of an operation flow of the second exemplary embodiment of the present invention.

FIG. 7 illustrates a flow of automatic adjustment processing of frequencies for transmission and reception of the wireless communication device 3. It is to be noted that the wireless communication device which is a counterpart of the wireless communication device 3 is assumed to also perform the same processing.

The frequency adjustment processing means 31 divides the usable frequency band 50 that the wireless communication device 3 can handle by the frequency division number 51, which are stored in the frequency adjustment plan parameter 5 illustrated in FIG. 5, to derive a choice of a dynamic-variable frequency.

By setting the divided frequency value in the reception function means 302 and checking a radio wave reception status, the frequency adjustment processing means 31 determines whether the frequency is in use (in other words, whether the frequency is unusable or usable in the present wireless communication device 3) or not and creates a list of a choice of a usable frequency.

A criterion, for determining whether a target frequency is in use or not at a place where the wireless communication device 3 is placed, may be, for example, to compare the radio field intensity received by the reception function means 302 with the radio field intensity threshold value 53 stored in the frequency adjustment plan parameter 5. For example, when the received radio field intensity is higher than the radio field intensity threshold value 53, it is determined that another wireless communication device uses the frequency and that the frequency cannot be used in the present wireless communication device 3.

The frequency adjustment processing means 31 derives the expiration date field 40 by using the current system time of the wireless communication device 3 measured by the clocking means 34 and the frequency switching interval 52 stored in the frequency adjustment plan parameter 5.

The transmission frequency field 41 and the reception frequency field 42 are set to be a combination of frequencies that do not overlap at the same expiration date (time) from the created list of a choice of a usable frequency to derive the frequency adjustment plan 4. The derived frequency adjustment plan 4 is stored in the recording means 32 (Step 71, hereinafter, Step will be referred to as S). It is to be noted that the wireless communication device 3 creates the frequency adjustment plan 4 illustrated in FIG. 4 on the basis of the frequency adjustment plan parameter 5 illustrated in FIG. 5 in the present exemplary embodiment, but the way of providing a frequency adjustment plan is not limited thereto. For example, the frequency adjustment plan 4 may be stored in the wireless communication device 3 in advance at factory shipment, or the wireless communication device 3 may receive the frequency adjustment plan parameter 5 from outside and create the frequency adjustment plan 4 on the basis of it. In addition, the frequency adjustment plan 4 may be inputted to the wireless communication device 3 from outside.

Transmission processing (S72) and reception processing (S73) operate asynchronously.

In the transmission processing (S72), the reception frequency change plan data 6 is created on the basis of the frequency adjustment plan 4, and data transmission to the wireless communication device which is a counterpart is performed.

In the reception processing (S73), a change of the reception frequency is performed on the basis of the frequency adjustment plan 4, and reception of the reception frequency change plan data 6 transmitted from the wireless communication device which is a counterpart and created by the wireless communication device which is a counterpart is performed. When the reception of the reception frequency change plan data 6 succeeds, the reception function means 302 notifies the frequency adjustment processing means 31 of the received reception frequency change plan data 6 (S74).

Figure 8:
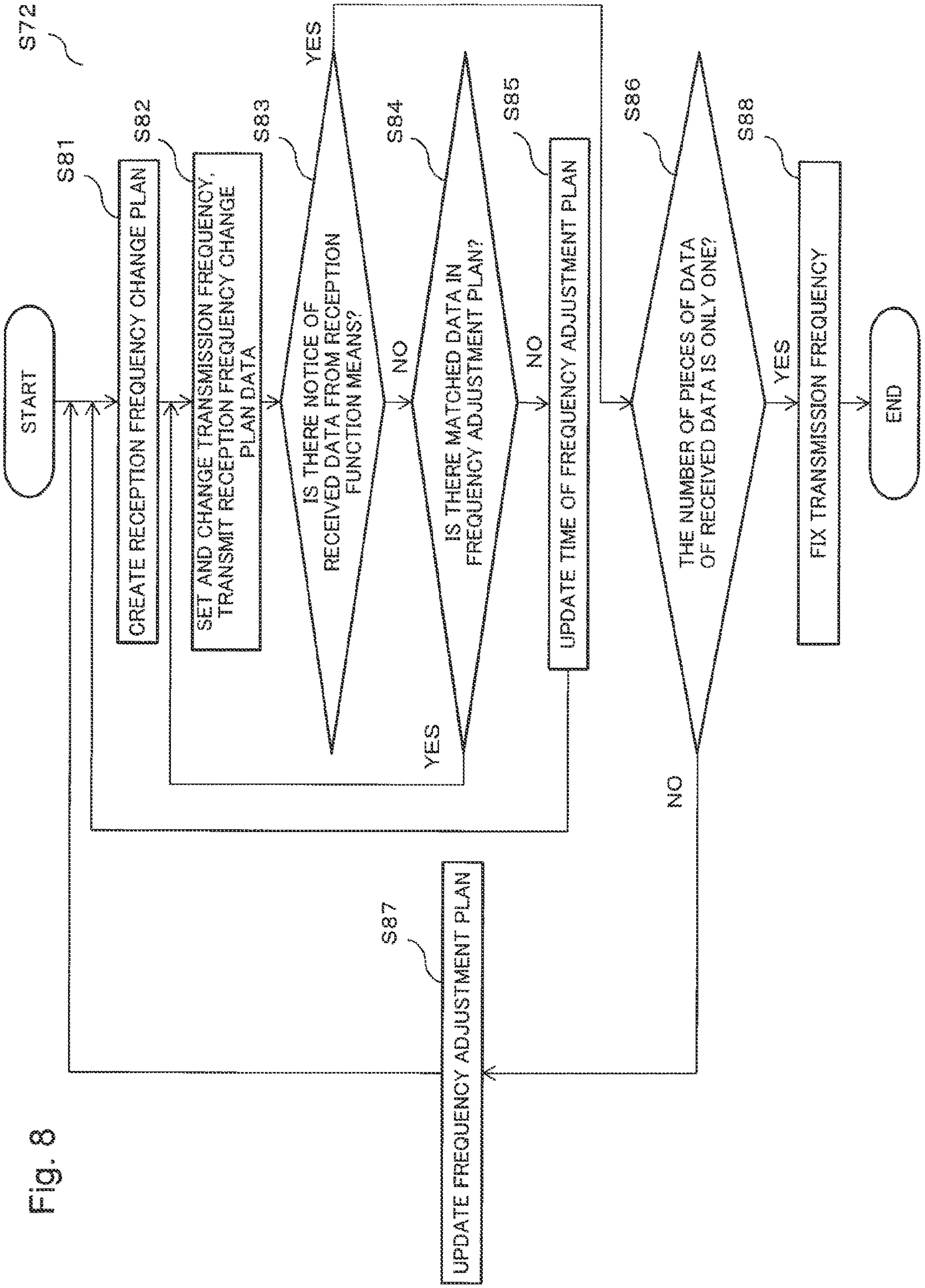
FIG. 8 illustrates a detailed example of an operation flow of transmission processing of the second exemplary embodiment of the present invention.

FIG. 8 illustrates a detailed processing flow of the transmission processing (S72 of FIG. 7).

The frequency adjustment processing means 31 creates the reception frequency change plan data 6 on the basis of the current system time of the wireless communication device 3 measured by the clocking means 34 of the wireless communication device 3, and the expiration date field 40 and the reception frequency field 42 of the frequency adjustment plan 4 (S81). FIG. 6 illustrates an example of the created reception frequency change plan data 6.

The frequency adjustment processing means 31 extracts a transmission frequency corresponding to relevant data in the expiration date field 40 of the frequency adjustment plan 4, on the basis of the current system time of the wireless communication device 3 measured by the clocking means 34 of the wireless communication device 3. For example, when the system time of the wireless communication device 3 is before the expiration date 1 of the frequency adjustment plan 4, the frequency adjustment processing means 31 extracts the transmission frequency 1.

The frequency adjustment processing means 31 submits a setting notice to the wireless conversion function means 30 such that the transmission function means 301 performs transmission at the extracted transmission frequency. The wireless conversion function means 30 that has received the notice sets a transmission frequency of the transmission function means 301 on the basis of the setting notice received from the frequency adjustment processing means 31. For example, when the extracted transmission frequency is the transmission frequency 1 illustrated in FIG. 4, the frequency adjustment processing means 31 performs a setting notice with respect to the wireless conversion function means 30 such that the transmission frequency of the transmission function means 301 is the transmission frequency 1. The wireless conversion function means 30 that has received the notice performs setting of the transmission function means 301 such that the transmission frequency of the transmission function means 301 is the transmission frequency 1.

When the present transmission frequency is different from the transmission frequency extracted from the frequency adjustment plan 4, the frequency adjustment processing means 31 submits a transmission frequency change notice to the wireless conversion function means 30. The wireless conversion function means 30 sets the transmission frequency of the transmission function means 301 on the basis of the change notice received from the frequency adjustment processing means 31. For example, the case when the system time, of the wireless communication device 3, is changed from before the expiration date 1 of the frequency adjustment plan 4 to before the expiration date 2 (after the expiration date 1 and before the expiration date 2) is considered. In this case, the frequency adjustment processing means 31 performs a transmission frequency change notice to the wireless conversion function means 30 such that the present transmission frequency 1 set in the transmission function means 301 is changed to the transmission frequency 2. The wireless conversion function means 30 that has received the change notice performs setting of the transmission function means 301 such that the transmission frequency of the transmission function means 301 is the transmission frequency 2.

The transmission function means 301 transmits the reception frequency change plan data 6 at the set transmission frequency at regular intervals until the system time of the wireless communication device 3 reaches the expiration date (S82). For example, as illustrated in FIG. 4, when the system time is before the expiration date 1, the transmission processing of data is performed at the transmission frequency 1 until the expiration date 1.

Next, during the transmission processing of data by the transmission function means 301, the frequency adjustment processing means 31 determines whether the notice of receiving the reception frequency change plan data 6 of the wireless communication device which is a counterpart and the data have been received or not from the reception function means 302 (S83). It is to be noted that, in the processing of S83, it is determined whether the notice of S74 of FIG. 7 is performed or not.

When the notice and the data have been received (S83, YES), the processing flow proceeds to S86. It is to be noted that the above-described notice and data received from the reception function means 302 will be described below.

When the notice and the data have not been received (S83, NO), the frequency adjustment processing means 31 determines whether there is data that matches the current system time in the expiration date field 40 of the frequency adjustment plan 4 or not (S84).

When there is matched data (S84, YES), the frequency adjustment processing means 31 extracts a transmission frequency corresponding to the matched data, and performs the transmission processing of data at the transmission frequency (return to S82).

When there is no matched data (S84, NO), the frequency adjustment processing means 31 updates the expiration date field 40 of the frequency adjustment plan 4 such that the transmission processing with respect to all pieces of data of the frequency adjustment plan 4 is performed again (S85). The update processing may be performed on the basis of the current system time and the frequency switching interval 52, for example. It is to be noted that the update may be performed using an interval different from an interval specified by the frequency switching interval 52 during the update processing.

After the update, the processing from S81 is performed again on the basis of the updated frequency adjustment plan 4.

When the notice of receiving the reception frequency change plan data 6 of the wireless communication device which is a counterpart has been received (S83,YES), the frequency adjustment processing means 31 performs determination of the number of pieces of data in the reception frequency change plan data 6 received from the reception function means 302 (S86).

In the case where the number of pieces of data of the reception frequencies of the received reception frequency change plan data 6 is more than one (S86, NO), the frequency adjustment processing means 31 updates the frequency adjustment plan 4 (S87). It is to be noted that the case where the number of pieces of data is more than one means the case where there are a plurality of (n in the case of FIG. 6) combinations of the reception frequencies and the expiration dates thereof as in the reception frequency change plan data 6 of FIG. 6, for example.

Regarding the above-described update processing, for example, the frequency adjustment processing means 31 may update the values of the expiration date field 40 of the frequency adjustment plan 4 on the basis of the values of the expiration dates stored in the above-described received data 6.

In addition, for example, the expiration date field 40 of the frequency adjustment plan 4 may be updated on the basis of the system time of the wireless communication device 3, the expiration dates and a system time of a counterpart when transmitting wireless data, included in the above-described received data 6.

In addition, for example, the frequency adjustment processing means 31 may update the expiration date field 40 and the transmission frequency field 41 of the frequency adjustment plan 4 by taking a temporal difference between the system time 60 stored in the above-described received data 6 and the system time of the wireless communication device 3 into account.

In addition, for example, the transmission frequency field 41 and the expiration date field 40 of the frequency adjustment plan 4 may be updated such that the reception frequency change plan data 6 is transmitted from the own device in accordance with reception frequencies for which the wireless communication device which is a counterpart waits and the expiration dates thereof.

In addition, for example, from a time when the own device receives the above-described data 6 and the system time stored in the above-described received data 6, a time from when the above-described received data 6 is transmitted to when is received is calculated, and the frequency adjustment plan 4 may be updated by taking the time into account.

In addition, for example, frequencies other than the reception frequencies stored in the received reception frequency change plan data 6 of the wireless communication device which is a counterpart may be deleted from the data of the frequency adjustment plan 4. In other words, for example, the case where the reception frequencies stored in the above-described received data 6 are F1, F2, and F3 is considered. In this case, data other than F1, F2, and F3 of the transmission frequency field 41 of the frequency adjustment plan 4 may be deleted. In addition, data of the expiration date field 40 and data of the reception frequency field 42 corresponding to the deleted data may also be deleted.

In addition, for example, the case where the values of the reception frequencies stored in the received reception frequency change plan data 6 of the wireless communication device which is a counterpart are not included in the transmission frequency field 41 of the frequency adjustment plan 4 is considered. In this case, values corresponding to the reception frequencies may be added to the transmission frequency field 41. It is to be noted that, at this time, reception frequency data corresponding to the added transmission frequency data is a reception frequency when the reception function means receives the above-described data 6 from the wireless communication device which is a counterpart, which is described below. It is to be noted that, at this time, expiration date data corresponding to the added transmission frequency data may be added on the basis of the received frequency change plan data 6.

Figure 9:
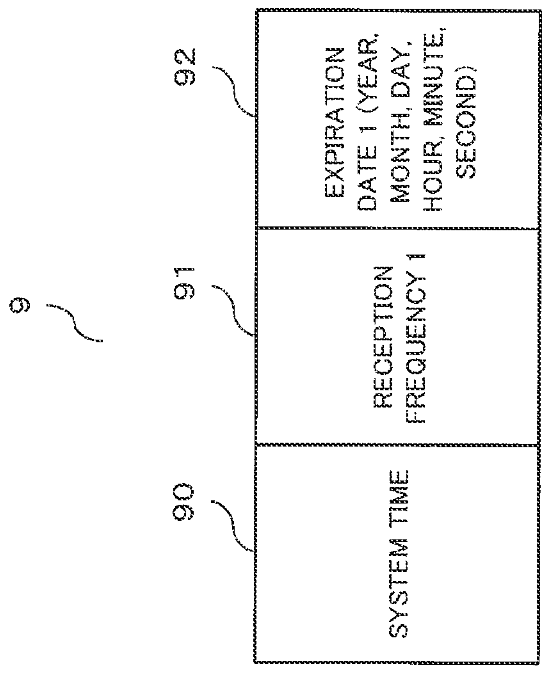
FIG. 9 illustrates another example of the reception frequency change plan data of the second exemplary embodiment of the present invention.

Next, the case where the number of pieces of data of the reception frequencies stored in the received reception frequency change plan data 6 is one (S86, YES) is considered. It is to be noted that the case where the number of pieces of data is one means the case where a combination of a reception frequency 91 and an expiration date 92 thereof is one, as in reception frequency change plan data 9 of FIG. 9, for example. It is to be noted that, in addition to the case of FIG. 9, also in the case where reception frequencies corresponding to different expiration dates are the same, it may be determined that the number of pieces of data is one. Examples thereof include the case where frequencies that correspond to the expiration dates 1 to n, respectively, are all the reception frequency 1 in FIG. 6.

When the number of pieces of data of the reception frequencies stored in the received reception frequency change plan data 6 is one, the frequency adjustment processing means 31 updates the frequency adjustment plan 4 in accordance with the value of the reception frequency stored in the reception frequency change plan data 6 (S88). For example, when only the reception frequency 1 and the expiration date 1 are stored as in FIG. 9, it can be determined that the wireless communication device which is a counterpart constantly waits for reception at the reception frequency 1. Therefore, the update may be performed such that the value of the transmission frequency field 41 of the frequency adjustment plan 4 of the wireless communication device 3 is the value of the reception frequency 1 to fix the transmission frequency.

Next, the frequency adjustment processing means 31 submits a transmission frequency change notice to the wireless conversion function means 30 so as to change the transmission frequency of the wireless communication device 3 on the basis of the updated frequency adjustment plan 4. The wireless conversion function means 30 sets the transmission frequency of the transmission function means 301 on the basis of the change notice received from the frequency adjustment processing means 31 (S88). Accordingly, the transmission function means 301 performs transmission of data at the set transmission frequency.

It is to be noted that the processing of S83 that determines whether the notice is received or not from the reception function means 302 need not be performed after S82, and may be performed after S84, for example. In other words, whether the notice is received or not from the reception function means 302 may be determined at arbitrary timing during the transmission processing performed from S81 to S85.

Figure 10:
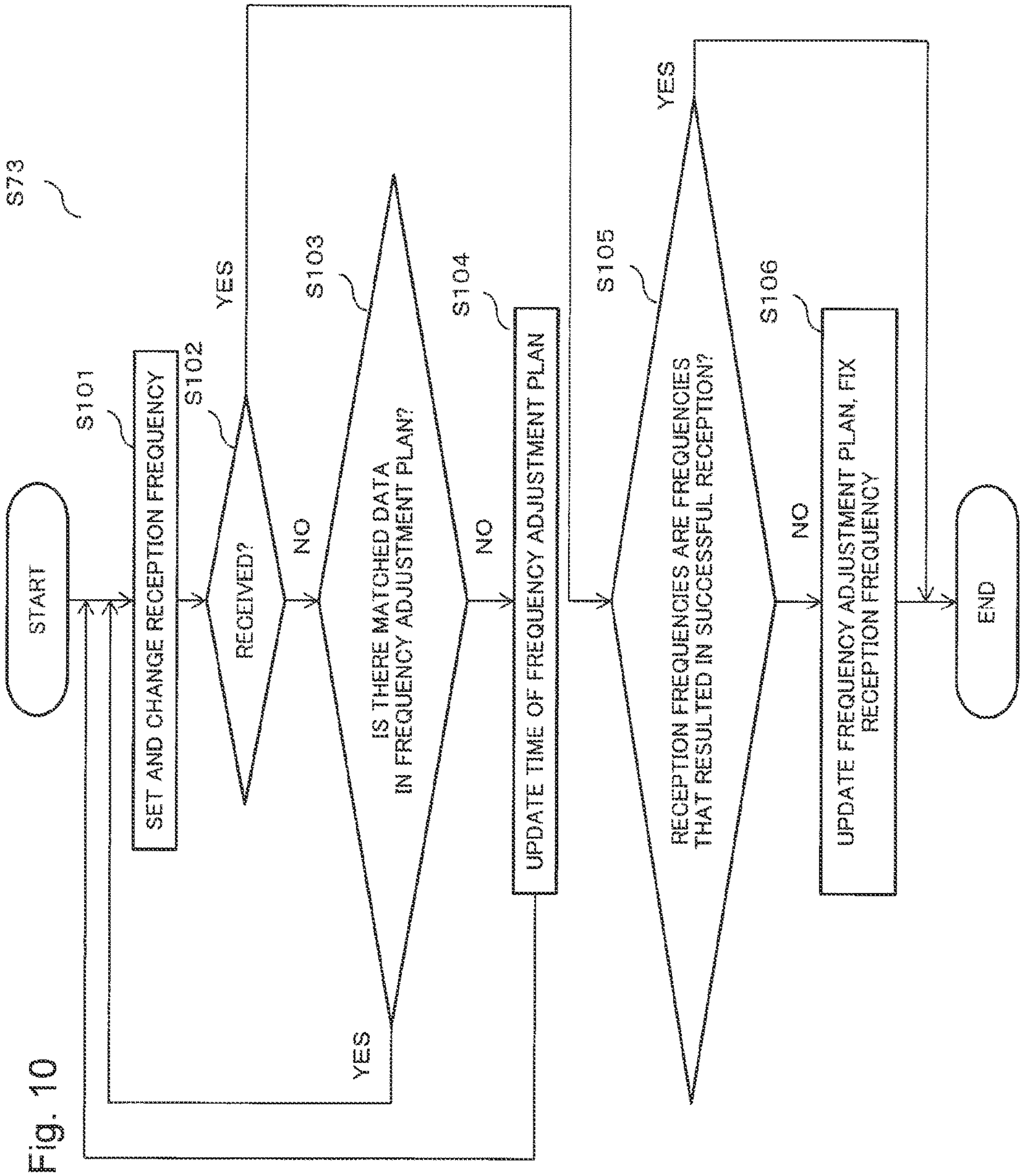
FIG. 10 illustrates a detailed example of an operation flow of reception processing of the second exemplary embodiment of the present invention.

FIG. 10 illustrates a detailed processing flow of the reception processing (S73 of FIG. 7).

The frequency adjustment processing means 31 extracts a reception frequency corresponding to relevant data in the expiration date field 40 of the frequency adjustment plan 4, on the basis of the current system time of the wireless communication device measured by the clocking means 34 of the wireless communication device 3. For example, when the system time of the wireless communication device is before the expiration date 1 of the frequency adjustment plan 4, the frequency adjustment processing means 31 extracts the reception frequency 1.

The frequency adjustment processing means 31 submits a setting notice to the wireless conversion function means 30 such that the reception function means 302 performs reception at the extracted reception frequency. The wireless conversion function means 30 that has received the notice sets a reception frequency of the reception function means 302 on the basis of the setting notice received from the frequency adjustment processing means 31. For example, when the extracted reception frequency is the reception frequency 1 illustrated in FIG. 4, the frequency adjustment processing means 31 performs a setting notice with respect to the wireless conversion function means 30 such that the reception frequency of the reception function means 302 is the reception frequency 1. The wireless conversion function means 30 that has received the notice performs setting of the reception function means 302 such that the reception frequency of the reception function means 302 is the reception frequency 1.

When the present reception frequency is different from the reception frequency extracted from the frequency adjustment plan 4, the frequency adjustment processing means 31 submits a reception frequency change notice to the wireless conversion function means 30. The wireless conversion function means 30 sets the reception frequency of the reception function means 302 on the basis of the change notice received from the frequency adjustment processing means 31. For example, the case where the system time of the wireless communication device 3 that was before the expiration date 1 of the frequency adjustment plan 4 has changed and now is before the expiration date 2 (after the expiration date 1 and before the expiration date 2) is considered. In this case, the frequency adjustment processing means 31 performs a reception frequency change notice to the wireless conversion function means 30 such that the reception frequency 1 set in the reception function means 302 is changed to the reception frequency 2. The wireless conversion function means 30 that has received the change notice performs setting of the reception function means 302 such that the reception frequency of the reception function means 302 is the reception frequency 2.

The reception function means 302 performs reception processing of the reception frequency change plan data 6 transmitted from the wireless communication device which is a counterpart until the system time of the wireless communication device 3 reaches the expiration date (S101). For example, as illustrated in FIG. 4, when the system time is before the expiration date 1, the reception processing of data is performed at the reception frequency 1 until the expiration date 1. It is to be noted that the reception frequency change plan data 6 transmitted from the wireless communication device which is a counterpart is created by the wireless communication device which is a counterpart.

Next, during the reception processing of data by the reception function means 302, the frequency adjustment processing means 31 determines whether the notice of receiving the reception frequency change plan data 6 of the wireless communication device which is a counterpart has been received or not from the reception function means 302 (S102).

When the notice has not been received (S102, NO), the frequency adjustment processing means 31 determines whether there is data that matches the current system time in the expiration date field 40 of the frequency adjustment plan 4 or not (S103).

When there is matched data (S103, YES), the frequency adjustment processing means 31 extracts a reception frequency corresponding to the matched data, and performs the reception processing at the reception frequency (return to S101).

When there is no matched data (S103, NO), the frequency adjustment processing means 31 updates all the expiration date field 40 of the frequency adjustment plan 4 such that the reception processing with respect to all pieces of data of the frequency adjustment plan 4 is performed again (S104). The update processing may be performed on the basis of the current system time and the frequency switching interval 52, for example. It is to be noted that the update may be performed using an interval different from an interval specified by the frequency switching interval 52 during the update processing.

After the update, the processing from S101 is performed again, on the basis of the updated frequency adjustment plan 4.

When the notice has been received (S102, YES), the frequency adjustment processing means 31 determines whether all the frequencies of the reception frequency field 42 of the frequency adjustment plan 4 are frequencies which resulted in a successful reception or not (S105).

When all the frequencies are frequencies that resulted in a successful reception (S105, YES), the processing is terminated.

When not all the frequencies are frequencies that resulted in a successful reception (S105, NO), the frequency adjustment processing means 31 updates the frequency adjustment plan 4 (S106). In other words, data of the reception frequency field 42 of the frequency adjustment plan 4 is replaced with the reception frequency that resulted in a successful reception such that the reception frequency field 42 of the frequency adjustment plan 4 has the value of the reception frequency that resulted in a successful reception. For example, the case when the reception frequency change plan data 6 is received from the wireless communication device which is a counterpart at the reception frequency 1 (i.e., the wireless communication device which is a counterpart transmits the data 6 at the transmission frequency 1) is considered. In this case, the frequency adjustment processing means 31 replaces the data of the reception frequency field 42 of the frequency adjustment plan 4 with the value of the reception frequency 1 to fix the reception frequency. It is to be noted that, when a same value as the reception frequency exists in a piece of data in the transmission frequency field 41, the piece of data is deleted from the frequency adjustment plan 4. For example, when the reception frequency field 42 is replaced with the value of the reception frequency 1, data that includes the same value as the reception frequency 1 may be deleted from the transmission frequency field 41 of the frequency adjustment plan 4. In addition, along with such deletion, each of data of the expiration date and data of the reception frequency corresponding to the transmission frequency may be deleted. This is for preventing the transmission frequency and the reception frequency being the same value in the same expiration date.

Next, the frequency adjustment processing means 31 receives the reception frequency change plan data 6 of the wireless communication device which is a counterpart from the reception function means 302, and the frequency adjustment processing means 31 performs the processing after S83, YES, of FIG. 8.

It is to be noted that the processing of S102 that determines whether the reception frequency change plan data 6 of the wireless communication device which is a counterpart has been received or not from the reception function means 302 need not be performed necessarily after S101. For example, the processing of S102 may be performed after S104, and in other words, the above-described determination may be performed at arbitrary timing during the reception processing performed from S101 to S104.

It is to be noted that, in the second exemplary embodiment, the processing example of one wireless communication device among wireless communication devices that perform wireless transmission has been described, but a wireless communication device which is a counterpart of the wireless communication device also performs the same processing.

In the second exemplary embodiment of the present invention, a wireless communication device creates reception frequency change plan data on the basis of a frequency adjustment plan. Then, transmission of the created reception frequency change plan data and reception of reception frequency change plan data transmitted from a wireless communication device which is a counterpart are performed. When receiving the reception frequency change plan data transmitted from the wireless communication device which is a counterpart, the wireless communication device updates the frequency adjustment plan. The update processing updates a transmission frequency of the frequency adjustment plan in accordance with a reception frequency of the wireless communication device which is a counterpart, which is stored in the received data. In addition, a reception frequency of the frequency adjustment plan is updated to be the reception frequency that resulted in a successful reception of the data. Accordingly, it is possible to easily determine and set frequencies used for transmission and reception, in a wireless communication device that uses different frequencies for transmission and reception of wireless data.

Therefore, according to the present exemplary embodiment, frequency tuning work when newly placing wireless communication devices is automated, and a large reduction in man-hours of adjusting work of frequencies used for transmission and reception can be expected.

Although exemplary embodiments of the present invention have been described, the present invention is not limited to the above-described exemplary embodiments. The present invention can be carried out on the basis of modification/substitution/adjustment of the respective exemplary embodiments. In other words, the present invention includes various modifications and alternations that can be achieved in accordance with the entire disclosure and technical ideas of the present description. It is to be noted that drawing reference symbols attached to the respective drawings are conveniently attached to the respective elements as examples to facilitate understanding, and are not intended to limit the present invention to the illustrated modes.

The whole or part of the exemplary embodiments disclosed above can be described as, but not limited to, the following supplementary notes.

Supplementary Note 1

A wireless communication device that uses different frequencies for a transmission frequency and a reception frequency of wireless data, the wireless communication device comprising:

a frequency adjustment processing means that creates, based on a first frequency adjustment plan that is a combination of the transmission frequency, the reception frequency, and a validity period of the transmission frequency and the reception frequency, first reception frequency change plan data including a system time of the wireless communication device, the validity period, and a combination of a reception frequency corresponding to the validity period;

a transmission means that transmits the first reception frequency change plan data at a transmission frequency corresponding to the validity period based on the first frequency adjustment plan; and a reception means that receives second reception frequency change plan data transmitted from a wireless communication device which is a counterpart and created based on a second frequency adjustment plan of the wireless communication device which is a counterpart at the reception frequency corresponding to the validity period of the first frequency adjustment plan, wherein the frequency adjustment processing means updates the first frequency adjustment plan based on the received second reception frequency change plan data.

Supplementary Note 2

The wireless communication device according to Supplementary note 1, wherein the frequency adjustment processing means updates the transmission frequency of the first frequency adjustment plan based on a reception frequency included in the second reception frequency change plan data.

Supplementary Note 3

The wireless communication device according to Supplementary note 1 or 2, wherein the frequency adjustment processing means deletes, from the first frequency adjustment plan, the combination of the transmission frequency, the reception frequency, and the validity period of the transmission frequency and the reception frequency, which includes a transmission frequency other than the reception frequency included in the second reception frequency change plan data among the plurality of transmission frequencies included in the first frequency adjustment plan.

Supplementary Note 4

The wireless communication device according to any one of Supplementary notes 1 to 3, wherein the frequency adjustment processing means adds a frequency that is not included in the plurality of transmission frequencies of the first frequency adjustment plan among the plurality of reception frequencies included in the second reception frequency change plan data to the first frequency adjustment plan as a transmission frequency.

Supplementary Note 5

The wireless communication device according to any one of Supplementary notes 1 to 4, wherein the frequency adjustment processing means updates the validity period of the first frequency adjustment plan based on a validity period included in the second reception frequency change plan data.

Supplementary Note 6

The wireless communication device according to any one of Supplementary notes 1 to 5, wherein the frequency adjustment processing means updates the validity period of the first frequency adjustment plan based on the system time indicating an internal time of the wireless communication device, the validity period and a system time of the wireless communication device which is a counterpart at a time of transmitting the wireless data included in the second reception frequency change plan data.

Supplementary Note 7

The wireless communication device according to any one of Supplementary notes 1 to 6, wherein the frequency adjustment processing means updates the reception frequency included in the first frequency adjustment plan to a value of the reception frequency that resulted in a successful reception of the second reception frequency change plan data.

Supplementary Note 8

The wireless communication device according to any one of Supplementary notes 1 to 7, wherein, when the reception frequency that resulted in a successful reception of the second reception frequency change plan data matches the transmission frequency included in the first reception frequency adjustment plan, the frequency adjustment processing means deletes, from the first reception frequency adjustment plan, the combination of the transmission frequency, the reception frequency, and the validity period of the transmission frequency and the reception frequency, which includes the matched transmission frequency.

Supplementary Note 9

A transmission and reception frequency determination method for a wireless communication device that uses different frequencies for a transmission frequency and a reception frequency of wireless data, the transmission and reception frequency determination method comprising:

creating, based on a first frequency adjustment plan that is a combination of the transmission frequency, the reception frequency, and a validity period of the transmission frequency and the reception frequency, first reception frequency change plan data including a system time of the wireless communication device, the validity period, and a combination of a reception frequency corresponding to the validity period;

transmitting the first reception frequency change plan data at a transmission frequency corresponding to the validity period based on the first frequency adjustment plan; and receiving second reception frequency change plan data transmitted from a wireless communication device which is a counterpart and created based on a second frequency adjustment plan of the wireless communication device which is a counterpart at the reception frequency corresponding to the validity period based on the first frequency adjustment plan, wherein the first frequency adjustment plan is updated based on the received second reception frequency change plan data.

Supplementary Note 10

The transmission and reception frequency determination method according to Supplementary note 9, updating the transmission frequency of the first frequency adjustment plan based on a reception frequency included in the second reception frequency change plan data.

Supplementary Note 11

The transmission and reception frequency determination method according to Supplementary note 9 or 10, deleting, from the first frequency adjustment plan, the combination of the transmission frequency, the reception frequency, and the validity period of the transmission frequency and the reception frequency, which includes a transmission frequency other than the reception frequency included in the second reception frequency change plan data among the plurality of transmission frequencies included in the first frequency adjustment plan.

Supplementary Note 12

The transmission and reception frequency determination method according to any one of Supplementary notes 9 to 11, adding a frequency that is not included in the plurality of transmission frequencies of the first frequency adjustment plan among the plurality of reception frequencies included in the second reception frequency change plan data to the first frequency adjustment plan as a transmission frequency.

Supplementary Note 13

The transmission and reception frequency determination method according to any one of Supplementary notes 9 to 12, updating the validity period of the first frequency adjustment plan based on a validity period included in the second reception frequency change plan data.

Supplementary Note 14

The transmission and reception frequency determination method according to any one of Supplementary notes 9 to 13, updating the validity period of the first frequency adjustment plan based on the system time indicating an internal time of the wireless communication device, the validity period and a system time of the wireless communication device which is a counterpart at a time of transmitting the wireless data included in the second reception frequency change plan data.

Supplementary Note 15

The transmission and reception frequency determination method according to any one of Supplementary notes 9 to 14, updating the reception frequency included in the first frequency adjustment plan to a value of the reception frequency that resulted in a successful reception of the second reception frequency change plan data.

Supplementary Note 16

The transmission and reception frequency determination method according to any one of Supplementary notes 9 to 15, when the reception frequency that resulted in a successful reception of the second reception frequency change plan data matches the transmission frequency included in the first reception frequency adjustment plan, deleting, from the first reception frequency adjustment plan, the combination of the transmission frequency, the reception frequency, and the validity period of the transmission frequency and the reception frequency, which includes the matched transmission frequency.

Supplementary Note 17

A computer-readable recording medium storing a program that makes a computer of a wireless communication device that uses different frequencies for a transmission frequency and a reception frequency of wireless data execute:

reception frequency change plan creation processing that creates, based on a first frequency adjustment plan that is a combination of the transmission frequency, the reception frequency, and a validity period of the transmission frequency and the reception frequency, first reception frequency change plan data including a system time of the wireless communication device, the validity period, and a combination of a reception frequency corresponding to the validity period;

transmission processing that transmits the first reception frequency change plan data at a transmission frequency corresponding to the validity period based on the first frequency adjustment plan;

reception processing that receives second reception frequency change plan data transmitted from a wireless communication device which is a counterpart and created based on a second frequency adjustment plan of the wireless communication device which is a counterpart at the reception frequency corresponding to the validity period of the first frequency adjustment plan; and frequency adjustment processing that updates the first frequency adjustment plan based on the received second reception frequency change plan data.

Supplementary Note 18

The computer-readable recording medium according to Supplementary note 17, wherein the frequency adjustment processing updates the transmission frequency of the first frequency adjustment plan based on a reception frequency included in the second reception frequency change plan data.

Supplementary Note 19

The computer-readable recording medium according to Supplementary note 17 or 18, wherein the frequency adjustment processing deletes, from the first frequency adjustment plan, the combination of the transmission frequency, the reception frequency, and the validity period of the transmission frequency and the reception frequency, which includes a transmission frequency other than the reception frequency included in the second reception frequency change plan data among the plurality of transmission frequencies included in the first frequency adjustment plan.

Supplementary Note 20

The computer-readable recording medium according to any one of Supplementary notes 17 to 19, wherein the frequency adjustment processing adds a frequency that is not included in the plurality of transmission frequencies of the first frequency adjustment plan among the plurality of reception frequencies included in the second reception frequency change plan data to the first frequency adjustment plan as a transmission frequency.

Supplementary Note 21

The computer-readable recording medium according to any one of Supplementary notes 17 to 20, wherein the frequency adjustment processing updates the validity period of the first frequency adjustment plan based on a validity period included in the second reception frequency change plan data.

Supplementary Note 22

The computer-readable recording medium according to any one of Supplementary notes 17 to 21, wherein the frequency adjustment processing updates the validity period of the first frequency adjustment plan based on the system time indicating an internal time of the wireless communication device, the validity period and a system time of the wireless communication device which is a counterpart at a time of transmitting the wireless data included in the second reception frequency change plan data.

Supplementary Note 23

The computer-readable recording medium according to any one of Supplementary notes 17 to 22, wherein the frequency adjustment processing updates the reception frequency included in the first frequency adjustment plan to a value of the reception frequency that resulted in a successful reception of the second reception frequency change plan data.

Supplementary Note 24

The computer-readable recording medium according to any one of Supplementary notes 17 to 23, wherein when the reception frequency that resulted in a successful reception of the second reception frequency change plan data matches the transmission frequency included in the first reception frequency adjustment plan, the frequency adjustment processing deletes, from the first reception frequency adjustment plan, the combination of the transmission frequency, the reception frequency, and the validity period of the transmission frequency and the reception frequency, which includes the matched transmission frequency.

The present invention has been described by taking the above-described exemplary embodiments as textbook examples. However, the present invention is not limited to the above-described exemplary embodiments. That is, various forms which can be understood by those skilled in the art can be applied to the present invention within the scope of the present invention.

This application is based upon and claims the benefit of priority from Japanese Patent Application No. 2014-047774 filed on Mar. 11, 2014, the disclosure of which is incorporated herein its entirety by reference.

INDUSTRIAL APPLICABILITY

The wireless communication device according to the invention of the present application can be applied to a wireless communication system that performs communication using different frequencies for a transmission frequency and a reception frequency of wireless data.

REFERENCE SIGNS LIST

10-1, 10-2, 11-1, 11-2, 12-1, 12-2, 2, 3 wireless communication device
20, 31 frequency adjustment processing means
21 transmission means
22 reception means
30 wireless conversion function means
301 transmission function means
302 reception function means
32 recording means
33 external antenna
34 clocking means
4 frequency adjustment plan
5 frequency adjustment plan parameter
6, 9 reception frequency change plan data

The invention claimed is:

1. A wireless communication device that uses different frequencies for a transmission frequency and a reception frequency of wireless data, the wireless communication device comprising:

a frequency adjustment processor that creates, based on a first frequency adjustment plan that includes a plurality of combinations of the transmission frequency, the reception frequency, and a validity period of the transmission frequency and the reception frequency, first reception frequency change plan data including a combination of a system time of the wireless communication device, the validity period of the reception frequency, and the reception frequency corresponding to the validity period;

a transmitter that transmits the first reception frequency change plan data at the transmission frequency corresponding to the validity period based on the first frequency adjustment plan; and a receiver that receives second reception frequency change plan data at the reception frequency corresponding to the validity period of the first frequency adjustment plan, the second reception frequency change plan data being transmitted from a wireless communication device which is a counterpart and being created based on a second frequency adjustment plan of the wireless communication device which is a counterpart, wherein the frequency adjustment processor updates the first frequency adjustment plan on the basis of the received second reception frequency change plan data and adds a frequency that is not included in a plurality of transmission frequencies of the first frequency adjustment plan among a plurality of reception frequencies included in the second reception frequency change plan data to the first frequency adjustment plan as a transmission frequency;

wherein the transmitter transmits at the transmission frequency corresponding to the updated first frequency adjustment plan.

2. The wireless communication device according to claim 1, wherein the frequency adjustment processor updates a transmission frequency of the first frequency adjustment plan based on a reception frequency included in the second reception frequency change plan data.

3. The wireless communication device according to claim 1, wherein the frequency adjustment processor deletes, from the first frequency adjustment plan, the combination of the transmission frequency, the reception frequency, and the validity period of the transmission frequency and the reception frequency, which includes a transmission frequency other than the reception frequency included in the second reception frequency change plan data among a plurality of transmission frequencies included in the first frequency adjustment plan.

4. The wireless communication device according to claim 1, wherein the frequency adjustment processor updates the validity period of the first frequency adjustment plan based on a validity period included in the second reception frequency change plan data.

5. The wireless communication device according to claim 1, wherein the frequency adjustment processor updates the validity period of the first frequency adjustment plan based on the system time indicating an internal time of the wireless communication device; and the validity period and a system time of the wireless communication device which is a counterpart at a time of transmitting the wireless data, the validity period and the system time being included in the second reception frequency change plan data.

6. The wireless communication device according to claim 1, wherein the frequency adjustment processor updates the reception frequency included in the first frequency adjustment plan to a value of a reception frequency that resulted in a successful reception of the second reception frequency change plan data.

7. The wireless communication device according to claim 1, wherein when a reception frequency that resulted in a successful reception of the second reception frequency change plan data matches the transmission frequency included in the first reception frequency adjustment plan, the frequency adjustment processor deletes, from the first reception frequency adjustment plan, the combination of the transmission frequency, the reception frequency, and the validity period of the transmission frequency and the reception frequency, which includes the matched transmission frequency.

8. A transmission and reception frequency determination method for a wireless communication device that uses different frequencies for a transmission frequency and a reception frequency of wireless data, the transmission and reception frequency determination method comprising:

creating, based on a first frequency adjustment plan that includes a plurality of combinations of the transmission frequency, the reception frequency, and a validity period of the transmission frequency and the reception frequency, first reception frequency change plan data including a combination of a system time of the wireless communication device, the validity period of the reception frequency, and the reception frequency corresponding to the validity period;

transmitting the first reception frequency change plan data at the transmission frequency corresponding to the validity period based on the first frequency adjustment plan; and receiving second reception frequency change plan data at the reception frequency corresponding to the validity period of the first frequency adjustment plan, the second reception frequency change plan data being transmitted from a wireless communication device which is a counterpart and being created based on a second frequency adjustment plan of the wireless communication device which is a counterpart, wherein the first frequency adjustment plan is updated based on the received second reception frequency change plan data, and a frequency that is not included in a plurality of transmission frequencies of the first frequency adjustment plan among a plurality of reception frequencies included in the second reception frequency change plan data is added to the first frequency adjustment plan as a transmission frequency;

transmitting at the transmission frequency corresponding to the updated first frequency adjustment plan.

9. A non-transitory computer-readable recording medium storing a program that makes a computer of a wireless communication device that uses different frequencies for a transmission frequency and a reception frequency of wireless data execute:

reception frequency change plan creation processing that creates, based on a first frequency adjustment plan that includes a plurality of combinations of the transmission frequency, the reception frequency, and a validity period of the transmission frequency and the reception frequency, first reception frequency change plan data including a combination of a system time of the wireless communication device, the validity period of the reception frequency, and the reception frequency corresponding to the validity period;

transmission processing that transmits the first reception frequency change plan data at the transmission frequency corresponding to the validity period based on the first frequency adjustment plan;

reception processing that receives second reception frequency change plan data at the reception frequency corresponding to the validity period of the first frequency adjustment plan, the second reception frequency change plan data being transmitted from a wireless communication device which is a counterpart and being created based on a second frequency adjustment plan of the wireless communication device which is a counterpart; and frequency adjustment processing that updates the first frequency adjustment plan on the basis of the received second reception frequency change plan data, and adds a frequency that is not included in a plurality of transmission frequencies of the first frequency adjustment plan among a plurality of reception frequencies included in the second reception frequency change plan data to the first frequency adjustment plan as a transmission frequency;

wherein the transmission processing transmits at the transmission frequency corresponding to the updated first frequency adjustment plan.

* * * * *